United States Patent [19]
Proebsting et al.
[11] 3,902,082
[45] Aug. 26, 1975

[54] DYNAMIC DATA INPUT LATCH AND DECODER

[75] Inventors: Robert James Proebsting; Robert Sherman Green, both of Richardson, Tex.

[73] Assignee: Mostek Corporation, Carrollton, Tex.

[22] Filed: Feb. 11, 1974

[21] Appl. No.: 441,500

[52] U.S. Cl. .......... 307/279; 307/238; 307/247 R; 307/270; 340/173 R

[51] Int. Cl.[2] .......... H03K 3/286; H03K 3/33; G11C 8/00; G11C 7/00

[58] Field of Search .......... 307/238, 270, 279, 291, 307/246, 247 R, 269; 340/173 AM, 173 R

[56] References Cited

UNITED STATES PATENTS

| | | | |
|---|---|---|---|
| 3,573,507 | 4/1971 | Eng | 307/279 |
| 3,610,965 | 10/1971 | Martin et al. | 307/279 |
| 3,676,700 | 7/1972 | Buchanan | 307/279 X |
| 3,757,310 | 9/1973 | Croxon | 307/238 X |
| 3,778,784 | 12/1973 | Karp et al. | 307/238 X |
| 3,795,898 | 3/1974 | Mehta et al. | 307/238 X |
| 3,801,964 | 4/1974 | Palfi | 307/238 X |

*Primary Examiner*—Michael J. Lynch
*Assistant Examiner*—Larry N. Anagnos
*Attorney, Agent, or Firm*—Hubbard, Thurman, Turner & Tucker

[57] ABSTRACT

A dynamic input latch and address decoder for use in the large scale MISFET integrated circuits such as dynamic random excess memories or the like is disclosed. The circuit includes an input latch which responds to a single low voltage logic input to produce and hold high voltage true and complement logic signals during a dynamic cycle. Both true and complement signals are at logic 0 level during a precharge period. Some number, N, of input latches are combined with $2^N$ decoder/line drivers which utilize the logic zero levels of both the true and complement outputs of the latches during the precharge cycle to produce a dynamic decoder which consumes substantially no power. The circuit also utilizes bootstrap capacitors to produce the highest levels and fastest transitions possible for the circuit.

7 Claims, 4 Drawing Figures

DYNAMIC DATA INPUT LATCH AND DECODER

This invention relates generally to metal-insulator-silicon field effect transistor (MISFET) integrated circuits and, more particularly, relates to an improved dynamic data input latch and address decoder for dynamic random access memories and the like.

Large scale MISFET integrated circuits are, to an increasing extent, being used as memory devices in digital data processing systems. Limitations upon the use of these devices generally revolve around their ability to interface with TTL bipolar logic circuits which have relatively low logic levels, typically from about 0.8 to 2.4 volts, the functional capacity of the circuits in terms of storage capacity and access time, the number of connector pins in the circuit package, and the power consumption of the circuit during normal operations.

The present invention is concerned with an improved data input latch which may be connected to directly receive low voltage logic signals from a bipolar transistor circuit. The input signal need be present for only a short period of time. The latch produces and holds both true and complement high level logic signals from the input signal circuit, and holds these logic levels for a sufficient period of time to operate a dynamic address decoder. The input latch generates a logic zero on both the true and complement outputs during a precharge period, after which only the true and complement logic output, but not both, exceeds the threshold voltage of the circuit. Consequently, N input latches are combined with $2^N$ dynamic address line driver circuits which take advantage of the characteristic of the input latch to provide a logic 0 level on both outputs during the precharge period and then to provide a logic 1 level on the appropriate output without the other output ever reaching or exceeding the transistor threshold voltage to provide a completely dynamic address decoder.

The novel features believed characteristic of this invention are set forth in the appended claims. The invention itself, however, as well as other objects and advantages thereof, may best be understood by reference to the following detailed description of illustrative embodiments, when read in conjunction with the accompanying drawings, wherein:

Figure 1:
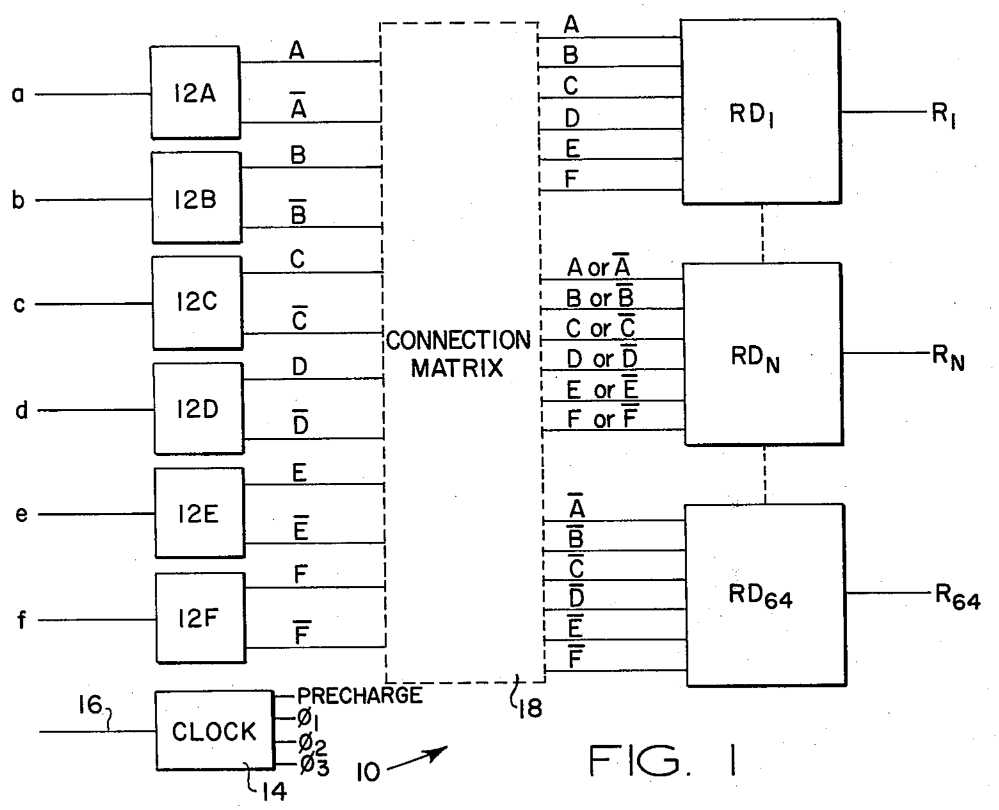
FIG. 1 is a block diagram illustrating an input latch and address decoder circuit in accordance with the present invention.

Referring now to the drawings, an input latch and decoder circuit in accordance with the present invention is indicated generally by the reference numeral 10 in FIG. 1. The circuit 10 is illustrated as having six input latches 12A through 12F, which receive six logic input signals A through F. A clock generator 14 receives a clock input on line 16 and produces four clock signals as will presently be described. Each of the input latches 12A through 12F produces true logic output signals $\overline{A}$–$\overline{F}$, respectively, and complement logic output signal A – F, respectively, which are applied through a connection matrix to 64 row decoders $RD_1 - RD_{64}$. Either a true output or a complement output from each of the six latches 12A – 12F is applied to the six logic inputs of each row decoder $RD_1 - RD_{64}$, with each combination of six logic inputs being unique for each row decoder. As a result, only one of the row output lines $R_1 - R_{64}$ will be at a logic 1 level at any time, as will hereafter be described. The connection matrix 18 is hard-wired, but the connections are not illustrated in detail. Similarly, only three row decoders $RD_1$, $RD_n$ and $RD_{64}$ are illustrated in FIG. 1.

Figure 2:
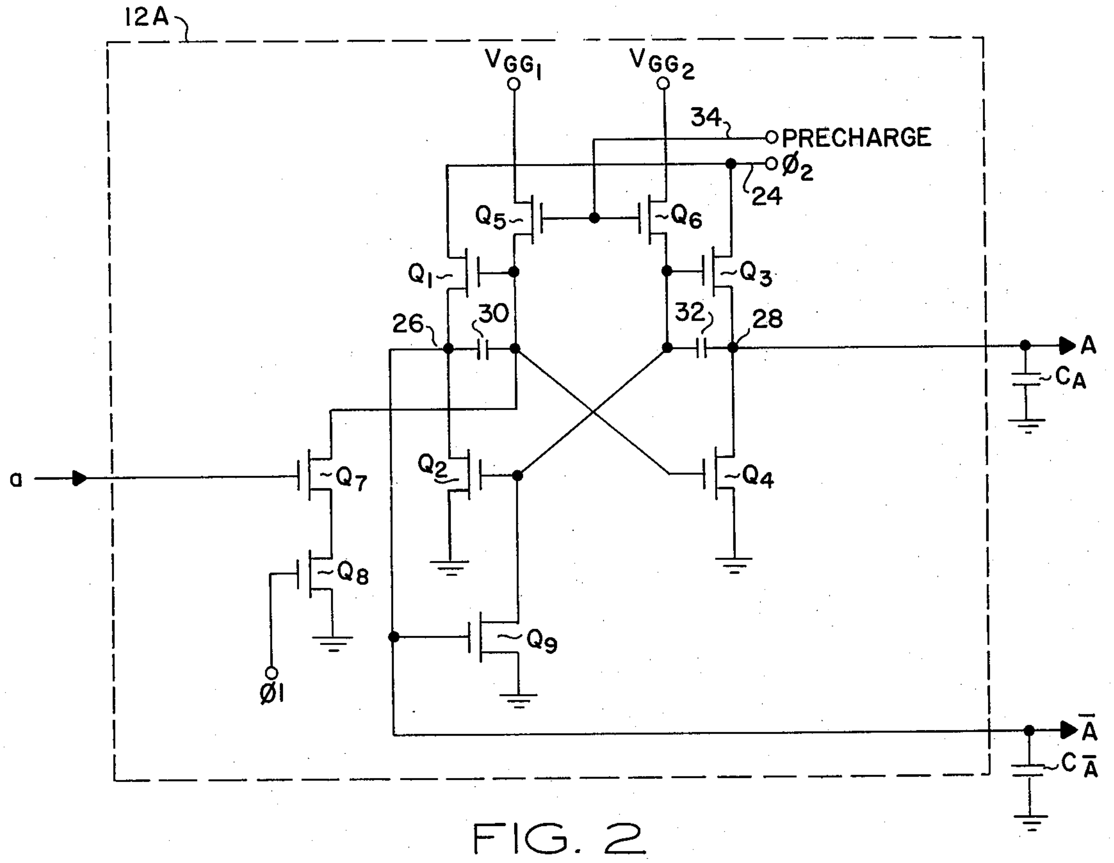
FIG. 2 is a schematic circuit diagram of an input latch of the circuit of FIG. 1.

The input latch 12A is illustrated in detail in the schematic circuit diagram of FIG. 2. The integrated circuit of the present invention utilizes enhancement mode N-channel transistors which turn on when the gate voltage is more positive than the source voltage. Accordingly, a logic 1 level will mean a positive voltage level sufficient to turn the transistors ON and a logic 0 level will be a voltage near ground.

The input latch 12A is comprised of transistors $Q_1$ and $Q_2$, the channels of which are connected in series between a clock node 24 for clock $\phi_2$, and electrical ground. A complement output node 26 is formed between the transistors $Q_1$ and $Q_2$ and is connected to the complement logic output $\overline{A}$. The channels of a pair of transistors $Q_3$ and $Q_4$ are also connected in series between clock node 24 and electrical ground and form a second output node 28 which is designated the true logic output A. The gate of transistor $Q_1$ is cross-coupled to the gate of transistor $Q_4$ and is connected by a bootstrap capacitor 30 to the output node 26. The gate of transistor $Q_3$ is cross-coupled to the gate of transistor $Q_2$ and is coupled to output node 28 by bootstrap capacitor 32. By adjustment of the width/length ratio for the channels, the transconductance of transistors $Q_1$ and $Q_4$ is significantly greater than that of transistors $Q_2$ and $Q_3$, typically 3 times, for purposes hereafter described.

The cross-coupled gate nodes of transistors $Q_1$ and $Q_4$ and the cross-coupled gate nodes of transistors $Q_2$ and $Q_3$ are precharged to near the supply voltages $V_{GG2}$ and $V_2$, respectively, which in the present case are both typically +12 volts, when precharge transistors $Q_5$ and $Q_6$ are turned on by a precharge clock pulse applied to node 34.

The cross-coupled gate nodes of transistors $Q_1$ and $Q_4$ are discharged to ground only by a concurrent logic 1 level applied to input *a* and the clock pulse $\phi_1$, which turns transistors $Q_7$ and $Q_8$ on simultaneously. The cross-coupled gate nodes of transistors $Q_2$ and $Q_3$ are discharged to ground when and if transistor $Q_9$ is turned on as a result of the voltage on output node 26 exceeding its threshold voltage.

Figure 3:
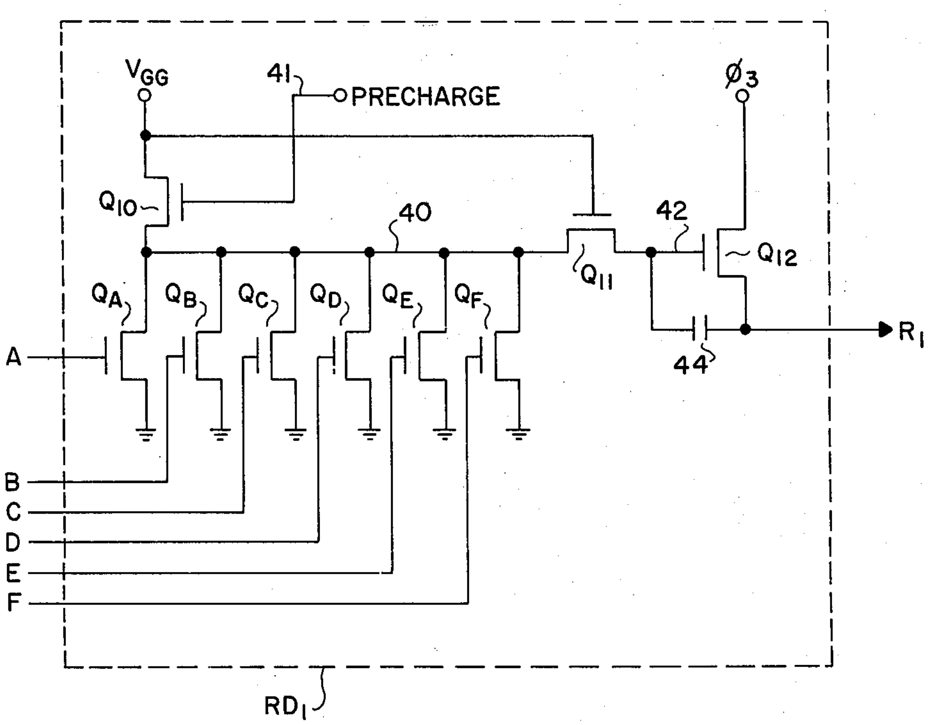
FIG. 3 is a schematic circuit diagram of an address line driver of the circuit of FIG. 1.

Row decoder $RD_1$ is shown in detail in the schematic circuit diagram of FIG. 3. The channels of six transistors $Q_A - Q_F$ connect a common precharge node 40 to ground. Thus, if any one of the transistors $Q_A - Q_F$ is turned on by a logic 1 level on inputs A – F, node 40 will be discharged to ground. Node 40 is precharged to a voltage one threshold less than the supply voltage $V_{GG}$ by transistor $Q_{10}$ which is turned on by the precharge pulse on node 41. Precharge node 40 is connected to control node 42 by a transistor $Q_{11}$. The gate of transistor $Q_{11}$ is continually connected to $V_{GG}$. Control node 42 is the gate node of transistor $Q_{12}$. The channel of transistor $Q_{12}$ connects a clock pulse $\phi_3$ to the row driver line $R_1$. The row driver line $R_1$ is connected back to control node 42 by a bootstrap capacitor 44.

Figure 4:
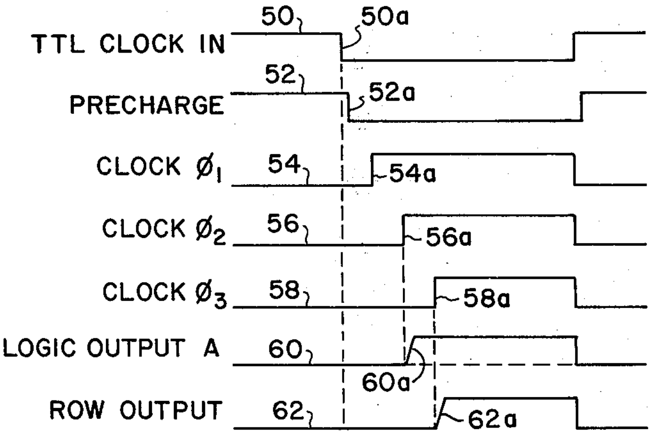
FIG. 4 is a timing diagram of the pulses produced in response to an input clock by the clock generator of the circuit of FIG. 1.

FIG. 4 illustrates the clock pulses which are produced by the clock 14 in response to a TTL clock signal applied to input 16 in FIG. 1. The input clock pulse from the TTL circuit is indicated by the time line 50, with the declining edge 50*a* indicating the start of a dynamic cycle. The precharge voltage signal is indicated by time line 52 and goes from a logic 1 level, which in the present case is a positive voltage approaching +12 volts, to ground in response to the input clock edge 50*a* as indicated by edge 52*a*. Edge 52*a* defines the end of the precharge period. Clock pulses $\phi_1$, $\phi_2$, and $\phi_3$ then go to logic 1 levels, as represented by edges 54*a*, 56*a* and 58*a* on lines 54, 56 and 58, respectively. As will presently be described, the voltage on the logic output A of the latch responds to clock pulse 56*a* as represented by event 60*a* on time line 60. The row driver line which is turned "on" responds as a result of clock pulse $\phi_3$, as represented by event 62*a* on time line 62.

Referring once again to FIG. 2, assume first that the TTL input line *a* is at a logic 1 level, i.e., a positive voltage typically from about 2.4 volts prior to the TTL clock input 60*a* in FIG. 4. The precharge clock line is then at a high level so that transistors $Q_5$ and $Q_6$ are turned on and the cross-coupled gate nodes of transistors $Q_1$ and $Q_4$ and the cross-coupled gate nodes of transistors $Q_2$ and $Q_3$ are charged to a voltage level approximately one threshold below the supply voltages $V_{GG1}$ and $V_{GG2}$, which are in this case equal. As a result, transistors $Q_1$, $Q_2$, $Q_3$ and $Q_4$ are all turned on. Since clock $\phi_2$ is at a logic 0 level, both output nodes 26 and 28 will be at a logic 0 level, and bootstrap capacitors 30 and 32 will be fully charged with a voltage approximately equal the gate supply voltages less one threshold. Since node 26 is at logic 0, transistor $Q_9$ will be turned off, and since clock $\phi_1$ is at a logic 0 level, transistor $Q_8$ will be turned off, thus permitting the cross-coupled gate nodes to be precharged. It will be noted that any change in the status of data input line *a* will not affect the circuit during the precharge period because of transistor $Q_8$.

In response to the clock edge 50*a* from the TTL circuit, the precharge voltage 52 goes to ground as represented by edge $52_a$, thus turning transistors $Q_5$ and $Q_6$ off. Next, clock $\phi_1$ goes to a logic 1 level at edge 54*a* to turn transistor $Q_8$ on. Assuming that TTL logic input *a* is at a logic 1 level, transistor $Q_7$ will also be ON so that the cross-coupled gate nodes of transistors $Q_1$ and $Q_4$ will be at least partially discharged, preferably to a point near ground, thus turning transistors $Q_1$ and $Q_4$ off. Then when clock $\phi_2$ goes to a logic 1 level, as represented by edge 56*a*, the true output node 28 switches toward a logic 1 level as a result of transistor $Q_3$ being on and transistor $Q_4$ being off. Similarly, the complement output node 26 is held at ground because transistor $Q_1$ is off and transistor $Q_2$ is on. This keeps transistor $Q_9$ off so that the cross-coupled gate nodes of transistors $Q_2$ and $Q_3$ can remain at a high voltage level. As the output node 28 swings positively in response to clock pulse $\phi_2$, the bootstrap capacitor 32 drives the cross-coupled gate nodes of transistors $Q_2$ and $Q_3$ to a voltage substantially above $V_{GG}$, thus keeping transistor $Q_3$ hard on and allowing the output node 28 to rapidly transition all the way to the peak voltage produced by the pulse $\phi_2$, which will be approximately $V_{GG}$.

Assume now that the TTL logic input *a* is a logic 0 level at the time the TTL clock edge 50*a* occurs. The cross-coupled gate nodes will again have been precharged to a voltage approximately one threshold less than the gate supply voltages $V_{GG}$ as a result of transistors $Q_5$ and $Q_6$ being turned on, and transistors $Q_8$ and $Q_9$ being turned off. Again, output nodes 26 and 28 will be at a logic 0 level because clock voltage $\phi_2$ is at ground and transistors $Q_1 - Q_4$ are all turned on. Bootstrap capacitors 30 and 32 will again be charged. Then when the precharge goes to a logic 0 level, as represented by event 52*a*, so that transistors $Q_5$ and $Q_6$ are turned off, clock pulse $\phi_1$ turns transistor $Q_8$ on. However, since logic input *a* is at a logic 0 level, transistor $Q_7$ is not turned on, and both the cross-coupled gate nodes of transistors $Q_1$ and $Q_4$ and the cross-coupled gate nodes of transistors $Q_2$ and $Q_3$ remain charged to a voltage one threshold below $V_{GG}$. Thus, when clock line $\phi_2$ goes high at 56*a*, all four transistors $Q_1 - Q_4$ are still turned on. However, since the transconductance of transistor $Q_1$ is substantially greater than the transconductance of transistor $Q_2$, and the transconductance of transistor $Q_3$ is substantially less than the transconductance of transistor $Q_4$, output node 26 will go positive at a substantially faster rate than output node 28. As a result, output node 26 will reach the threshold voltage of the transistors of the circuit considerably before node 28 reaches the threshold voltage. As soon as node 26 reaches threshold voltage, transistor $Q_9$ is turned on to begin discharging the cross-coupled gate nodes of transistors $Q_2$ and $Q_3$. As soon as transistor $Q_9$ begins to turn on, the conductance of transistors $Q_2$ and $Q_3$ is significantly decreased, so that the rate at which output node 26 is going positive increases and the rate at which output node 28 is going positive begins to decrease. If the transconductance of transistors $Q_1$ and $Q_4$ is approximately 3 times the transconductance of transistors $Q_2$ and $Q_3$, the voltages on output node 28 will not exceed a single threshold voltage before the cross-coupled gate nodes of transistors $Q_2$ and $Q_3$ are discharged and transistors $Q_2$ and $Q_3$ are turned fully off while transistors $Q_1$ and $Q_4$ remain turned full on. Again, it will be appreciated that bootstrap capacitor 30 allows transistors $Q_1$ and $Q_4$ to remain full on as output node 26 swings very rapidly to the full voltage level of clock pulse $Q_2$, which is typically $V_{GG}$.

Several features of the input latch 12*a* should be noted. First, the latch produces both true and complement logic outputs which are equal to the voltage of clock pulse $\phi_2$, which is normally the gate supply voltage $V_{GG}$, in response to a single low level true logic input of the type commonly supplied by a TTL bipolar integrated circuit. Also, it should be noted that both the true and complement inputs are at a logic 0 level during the entire precharge cycle. It is also important to note that only one of the logic outputs of the latch exceeds the threshold voltage of the circuit during the dynamic cycle. These logic functions are particularly useful in combination with the decoder which will presently be described. In addition, it will be noted that the input latch consumes no static power during either the precharge or dynamic cycle. During the precharge cycle, transistors $Q_8$ and $Q_9$ are turned off so that no current flows through transistors $Q_5$ and $Q_6$ from the supply voltages $V_{GG}$, except as necessary to precharge the cross-coupled gate nodes of transistors $Q_1 - Q_4$, and capacitors 30 and 32. Clock pulse $\phi_2$ is at ground during this period so that no power is consumed through transistors $Q_1 - Q_4$ even though all four transistors are turned on. After the precharge or static period, transistors $Q_5$ and $Q_6$ are turned off so that no power can be consumed through transistors $Q_8$ and $Q_9$ during the active or dynamic period. Additionally, during the dynamic cycle, transistors $Q_1$ and $Q_4$ are turned off in response to a logic 1 level so that no static power is consumed from clock $\phi_2$. Similarly, transistors $Q_2$ and $Q_3$ are turned off when the TTL logic input is at a logic 0 level so that power is consumed only during the initial race condition of the dynamic cycle..

The true and complement outputs from the six input latches 12A – 12F are applied to the row decoder circuits $RD_1$ – $RD_{64}$ by the connection matrix 18 in such a manner that all of the logic inputs to only one of the row decoders $RD_1$ - $RD_{64}$ will be at a logic 0 level. All 63 other row decoders will have at least one logic input at a logic 1 level.

Consider now the operation of row decoder $RD_1$ of FIG. 3 by referring to the timing diagram of FIG. 4. During the time when the precharge 52 is at a high level, transistor $Q_{10}$ is turned on to charge node 40, and thus node 42 because transistor $Q_{11}$ is also turned on. The nodes 40 and 42 can be charged because both the true and complement outputs of each of the latches 12A – 12F will be at a logic 0 level during the precharge period, so that all transistors $Q_A$ – $Q_F$ of all row decoders are assured being turned off. Soon after the occurence of clock pulse $\phi_2$ as represented by event 56*a*, either the true or complement output, but not both, from each of the latches 12A – 12F will go to a logic 1 level as represented by event 60*a* in FIG. 4. As a result, the nodes 40 and 42 of 63 of the 64 row decoders will be discharged through one or more of the transistors $Q_A$ – $Q_F$ of the respective decoder circuits. For these 63 decoder circuits, transistor $Q_{12}$ will be turned off so that the row driver line will remain at ground upon the occurence of clock pulse $\phi_3$. However, all six logic inputs of only one of the row decoders will remain at a logic 0 level after clock pulse $\phi_2$ so that the precharge nodes 40 and 42 will remain charged to a voltage 1 threshold less than $V_{GG}$ and thus keep transistor $Q_{12}$ on. Bootstrap capacitor 44 will also remain charged. Then clock pulse $\phi_3$ drives the row driver line $R_1$ to the voltage level of the clock $\phi_3$ represented by event 62*a* on time line 62. This is made possible by the bootstrap capacitor 44 which drives the nodes 42 substantially above $V_{GG}$ to keep transistor $Q_{12}$ turned full on as the row driver is driven to the full voltage of clock $\phi_3$. As node 42 is driven above $V_{GG}$, transistor $Q_{11}$ is turned off so that the capacitance of node 40 is isolated from the larger capacitance of node 42 to preserve a greater proportion of the voltage on node 42 and thus on the gate of transistor $Q_{12}$.

It will be appreciated by those skilled in the art that techniques other than the geometric variations in the transconductance of the transistors $Q_1$ and $Q_4$ from that of transistors $Q_2$ and $Q_3$ may be employed to establish the bias condition toward the logic 0 state when the data input is a logic 0. For example, the precharge voltage on the cross-coupled gate nodes of transistors $Q_2$ and $Q_3$ may be less than the precharge voltage on the cross-coupled gate nodes of transistors $Q_1$ and $Q_4$ merely by changing the values of gate supply voltages $V_{GG1}$ and $V_{GG2}$. This can be achieved merely by putting one or more additional transistors in series between the circuit $V_{GG}$ and transistor $Q_6$ so as to establish multiple threshold drops. Alternatively, the load capacitance driven by the output nodes 26 and 28 represented by capacitors $C_A$ and $C_{\bar{A}}$ in dotted outline in FIG. 2 can be imbalanced merely by adding capacitance to the load driven by output node 28 and thus slow the rate at which node 28 goes positive. In this regard, it will be appreciated that outputs 26 and 28 normally drive substantially identical capacitive loads, specifically 32 of the transistors $Q_A$ – $Q_F$ of the 64 decoder/address line drivers.

It should also be understood that the latch 12 can be used as a general purpose latch. For example, the true and complement output nodes 26 and 28 can be used to drive a push-pull output stage from the integrated circuit.

Although preferred embodiments of the invention have been described in detail, it is to be understood that various changes, substitutions and alterations can be made therein without departing from the spirit and scope of the invention as defined by the appended claims.

What is claimed is:

1. A data latch for an integrated circuit formed of field effect transistors which comprises:

first and second transistors the channels of which are connected in series between a second clock node and a source voltage node and which form a first output node between the two transistors, third and fourth field effect transistors the channels of which are connected in series between the second clock node and the source voltage node and which form a second output node between the two transistors, the gate nodes of the first and fourth transistors being cross-coupled and electrically common, the gate nodes of the second and third transistors being cross-coupled and electrically common, first and second charging circuit means for applying precharged voltages to the cross-coupled gate nodes of the first and fourth transistors and to the cross-coupled gate nodes of the second and third transistors, respectively, during a precharge period, first and second capacitive loads coupled to the first and second output nodes, respectively, first discharge circuit means responsive to a logic input signal for discharging the cross-coupled gate nodes of the first and fourth transistors in response to a first clock pulse if the logic input signal is a first binary logic level, second discharge circuit means responsive to a voltage on the first output node including a control transistor for discharging the cross-coupled gate nodes of the second and third transistors when the voltage on the first output node exceeds the threshold of the control transistor, and control circuit means for sequentially (a) precharging the cross-coupled gate nodes of the first and fourth transistors and the cross-coupled gate nodes of the second and third transistors to predetermined voltage levels through the first and second precharging circuit means, respectively, (b) applying the first clock pulse to the first discharge circuit means, and (c) applying the second clock pulse to the second clock node, the transconductance of the first, second, third and fourth transistors, the values of the load capacitors, and the relative values of the precharge voltage level applied to the respective cross-coupled gate nodes being such that the voltage of the first output node rises at a faster rate than the voltage of the second output node in response to the second clock pulse whereby the second discharge circuit means will discharge the voltage from the cross-coupled gate nodes of the second and third transistors when the logic input signal is the other binary logic level.

2. The data latch of claim 1 wherein the ratio of the transconductance of the first transistor to that of the second transistor is significantly greater than the ratio of the transconductance of the third transistor to that of the fourth transistor.

3. The data latch of claim 2 wherein the width-to-length ratios of the first transistor is significantly greater than the width-to-length ratio of the second transistor.

4. The data latch of claim 2 wherein the precharge voltage applied to the cross-coupled gate nodes of the first and fourth transistors is greater than that applied to the cross-coupled gate nodes of the second and third transistors.

5. The data latch of claim 2 wherein the load capacitance connected to the first output node is significantly less than the capacitance connected to the second output node.

6. The data latch of claim 1 further characterized by a first bootstrap capacitor coupling the first output node to the cross-coupled gate nodes of the first and fourth transistors and a second bootstrap capacitor coupling the second output node to the cross-coupled gate nodes of the second and third transistors.

7. An address decoder comprising a plurality of input latches each having at least one logic input and true and complement logic outputs, said latch including means for producing a logic 0 level on both logic outputs during a static period then producing a logic 1 level on one of the logic outputs and a logic zero on the other in response to a logic level on the logic input during a predetermined period of a dynamic period, each input latch comprising first and second transistors the channels of which are connected in series between a second clock node and a source voltage node and which form a first output node between the two transistors, third and fourth field effect transistors the channels of which are connected in series between the second clock node and the source voltage node and which form a second output node between the two transistors, the gate nodes of the first and fourth transistors being cross-coupled and electrically common, the gate nodes of the second and third transistors being cross-coupled and electrically common, first and second charging circuit means for applying precharged voltages to the cross-coupled gate nodes of the first and fourth transistors and to the cross-coupled gate nodes of the second and third transistors, respectively, during a precharge period, first and second capacitive loads coupled to the first and second output nodes, respectively, first discharge circuit means responsive to a logic input signal for discharging the cross-coupled gate nodes of the first and fourth transistors in response to a first clock pulse if the logic input signal is a first binary logic level, second discharge circuit means responsive to a voltage on the first output node including a control transistor for discharging the cross-coupled gate nodes of the second and third transistors when the voltage on the first output node exceeds the threshold of the control transistor, and control circuit means for sequentially (a) precharging the cross-coupled gate nodes of the first and fourth transistors and the cross-coupled gate nodes of the second and third transistors to predetermined voltage levels through the first and second precharging circuit means, respectively, (b) applying the first clock pulse to the first discharge circuit means, and (c) applying the second clock pulse to the second clock node, the transconductance of the first, second, third and fourth transistors, the values of the load capacitors, and the relative values of the precharge voltage level applied to the respective cross-coupled gate nodes being such that the voltage of the first output node rises at a faster rate than the voltage of the second output node in response to the second clock pulse whereby the second discharge circuit means will discharge the voltage from the cross-coupled gate nodes of the second and third transistors when the logic input signal is the other binary logic level, a plurality of address line drivers each comprising a drive transistor the channel of which connects a pulse source to an address line, a precharge node connected to the gate of the driver transistors, precharge circuit means for precharging the precharge node to a predetermined voltage level during the precharge period, a plurality of transistors the channels of which connect the precharged node to ground, the gate of each transistor being connected to one logic output node of one of the input latches, a transistor the channel of which connects the precharge node to the gate node of the driver transistor and the gate of which is connected to a voltage supply node, and a bootstrap capacitor connecting the address line to the gate node of the driver transistor.

* * * * *

UNITED STATES PATENT OFFICE

CERTIFICATE OF CORRECTION

PATENT NO. : 3,902,082

DATED : August 26, 1975

INVENTOR(S) : Robert J. Proebsting and Robert S. Sherman

It is certified that error appears in the above-identified patent and that said Letters Patent are hereby corrected as shown below:

Column 1, line 64, "$\bar{A}$ - $\bar{F}$" should be --A - F--.

Column 1, line 65, "A - F" should be --$\bar{A}$ - $\bar{F}$--.

Column 2, line 39, "$V_{GG2}$" should be --$V_{GG_1}$--.

Column 2, line 40, "$V_2$" should be --$V_{GG_2}$--.

Signed and Sealed this

*seventeenth* Day of *February 1976*

[SEAL]

*Attest:*

RUTH C. MASON
*Attesting Officer*

C. MARSHALL DANN
*Commissioner of Patents and Trademarks*